Jan. 19, 1926. 1,570,520
A. O. OEHRLI
TESTING APPLIANCE
Filed May 25, 1923
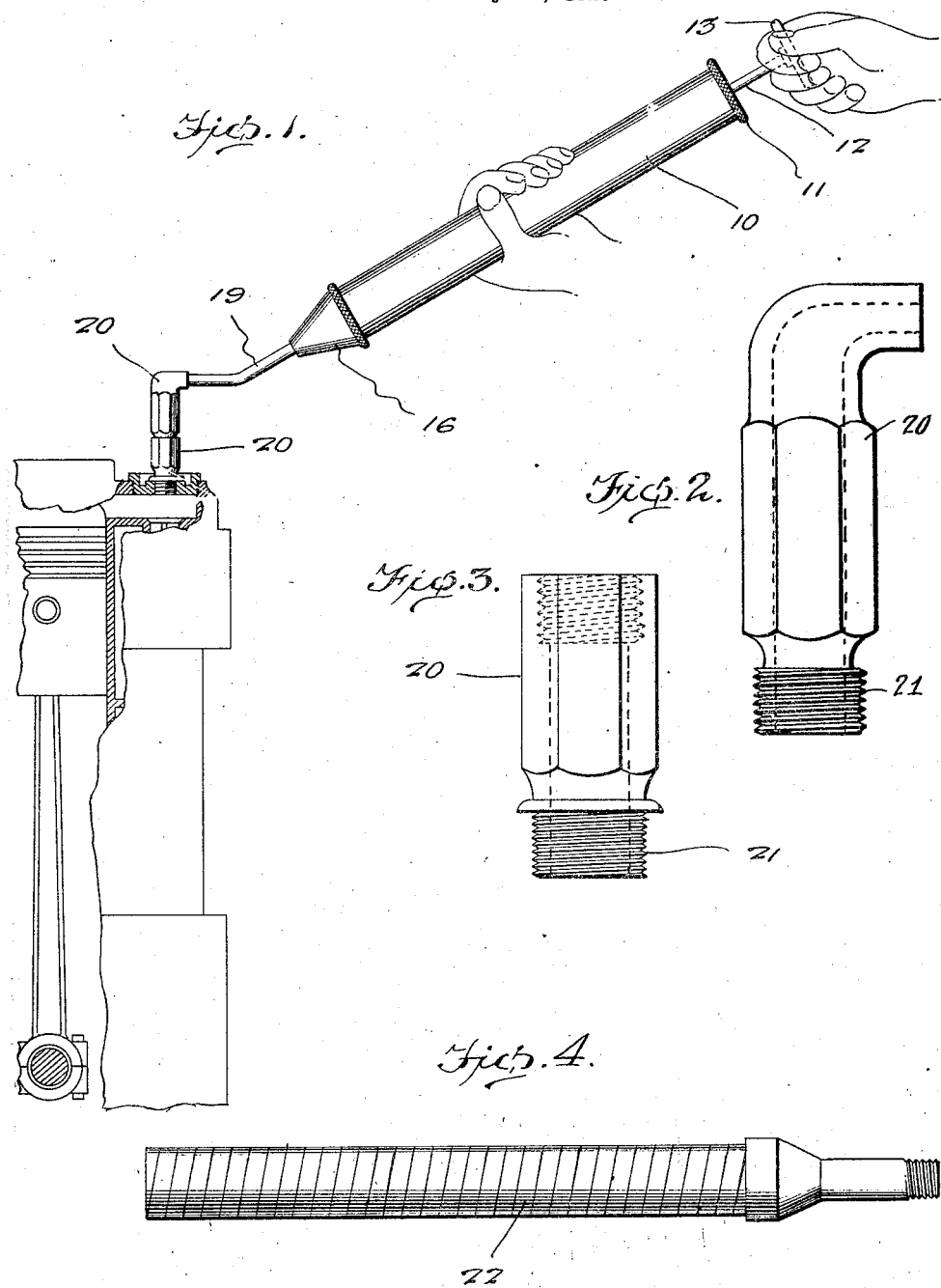
A. O. Oehrli INVENTOR
BY Victor J. Evans ATTORNEY Patented Jan. 19, 1926.

1,570,520

UNITED STATES PATENT OFFICE.

ARTHUR O. OEHRLI, OF WILLIAMSPORT, PENNSYLVANIA.

TESTING APPLIANCE.

Application filed May 25, 1923. Serial No. 641,526.

*To all whom it may concern:*

Be it known that I, ARTHUR O. OEHRLI, a citizen of the United States of America, residing at Williamsport, in the county of Lycoming and State of Pennsylvania, have invented new and useful Improvements in Testing Appliances, of which the following is a specification.

This invention contemplates the provision of a pump designed for finding motor trouble, commonly known as knocks.

The pump is primarily intended for use in the latter mentioned capacity, and by means of which a vacuum is created within the cylinder so that the user can determine from the sound of the loose member, whether or not the knock in the motor is the result of a worn piston, a wrist pin or a connecting rod bearing, the vacuum causing the loose part to move within the cylinder for this purpose.

The nature and advantages of the invention will be better understood when the following detailed description is read in connection with the accompanying drawings, the invention residing in the construction, combination and arrangement of parts as claimed.

In the drawings forming part of this application, like numerals of reference indicate similar parts in the several views, and wherein:

Figure 1 is a fragmentary sectional view through a motor showing the pump associated therewith for the purpose above mentioned.

Figure 2 is a detail view of the elbow connection for spark plug openings of a particular size.

Figure 3 is a similar view of a smaller connection for the same purpose.

Figure 4 is a view of a flexible connection used in conjunction with the pump for use, drawing carbon deposits from the cylinder.

The device forming the subject matter of this invention is adapted to be associated with a pump cylinder 10 closed at one end by a cap 11 through which the piston rod 12 reciprocates, the latter being equipped with a suitable handle 13, and a piston as will be readily apparent.

The pump may be used as an oil or grease force feed pump, and when it is desired to fill the pump with grease, the cone shaped end portion 16, which is threaded on one end of the cylinder is removed therefrom.

The primary purpose of the device is for determining the cause of a knock in a motor, and the knock can be traced to its respective cylinder, without any guess work or uncertainty of leakage. For this purpose I make use of a short length of pipe 19 having one end threaded into the small end of the cone shaped extension above referred to, and its other end threaded into an elbow coupling 20 as shown in Figures 2 and 3, these couplings are threaded at one end as at 21 to accommodate themselves to the spark plug openings of the cylinder blocks, the coupling in Figure 3 being slightly smaller than the coupling in Figure 2, so that the device can be used with either one-half or seven-eighth inch spark plug openings as will be readily understood.

In using the device for the purpose just mentioned, the motor is allowed to run until it reaches a warm temperature and then stopped. The motor is then turned over by the crank until the piston in the particular cylinder to be tested reaches the limit of its compression stroke or the point where the explosion occurs, at which point most wear is found. The spark plug is then removed, and the device associated with the motor in the manner shown in Figure 1. The plunger is quickly reciprocated, creating a vacuum within the cylinder, and causing a rocking effect upon the part or parts causing the knock. In other words, an experienced automobile repairman by carefully listening to the noise resulting from the formation of a vacuum in the cylinder in the manner described, can readily determine whether the knock in the motor is due to a worn piston, a wrist pin, or connecting rod bearing.

In addition to using the device in the capacity above mentioned, I provide a flexible tubing 22 which can be coupled with the cone shaped extension in place of the short length of pipe 19. This flexible tubing is then introduced into the firing chamber of a cylinder through the spark plug opening, and by reciprocating the piston, carbon deposits which have been scraped from the cylinder or withdrawn therefrom, into the cylinder 10 of the device.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

In a device of the character described, a pair of tubular elements each of which is provided with exterior screw threads at one end and one of which has interior screw threads to receive the adjacent threaded end of the other section, and the other exterior screw threaded end being adapted to be received in the spark plug opening of an internal combustion engine cylinder, wrench engaging surfaces formed upon each of the tubular sections, a lateral nipple formed upon the upper end of one of the sections, and a conduit having a portion of its length in alignment with the nipple and engaged therewith, and the remainder of its length extending upwardly at an oblique angle with respect to the vertical and adapted to communicate with a pump barrel.

In testimony whereof I affix my signature.

ARTHUR O. OEHRLI.